(12) United States Patent
Kou et al.

(10) Patent No.: US 11,251,447 B2
(45) Date of Patent: Feb. 15, 2022

(54) PROCESS AND SYSTEM FOR DETECTING LOW-LEVEL FUEL INJECTOR LEAKAGE IN A FUEL CELL SYSTEM

(71) Applicant: GM GLOBAL TECHNOLOGY OPERATIONS LLC, Detroit, MI (US)

(72) Inventors: Jie Kou, Novi, MI (US); Chad Dubois, Oxford, MI (US); Xiaofeng Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 214 days.

(21) Appl. No.: 16/788,833

(22) Filed: Feb. 12, 2020

(65) Prior Publication Data

US 2021/0249672 A1    Aug. 12, 2021

(51) Int. Cl.
| | |
|---|---|
| *H01M 8/0438* | (2016.01) |
| *H01M 8/04089* | (2016.01) |
| *H01M 8/04746* | (2016.01) |
| *B60L 58/30* | (2019.01) |
| *H01M 8/04664* | (2016.01) |

(52) U.S. Cl.
CPC ......... *H01M 8/04388* (2013.01); *B60L 58/30* (2019.02); *H01M 8/04089* (2013.01); *H01M 8/04679* (2013.01); *H01M 8/04753* (2013.01); *H01M 2250/20* (2013.01)

(58) Field of Classification Search
CPC ......... H01M 8/04388; H01M 8/04753; H01M 8/04089; H01M 8/04679; H01M 2250/20; B60L 58/30
See application file for complete search history.

(56) References Cited

U.S. PATENT DOCUMENTS

| | | | |
|---|---|---|---|
| 8,387,441 B2 * | 3/2013 | Falta .................. | G01F 1/34 73/40.5 R |
| 2008/0141760 A1 * | 6/2008 | Sienkowski ...... | H01M 8/04089 73/40.5 R |
| 2020/0119378 A1 * | 4/2020 | Min .................. | B60L 50/70 |
| 2021/0119233 A1 * | 4/2021 | Kemmer .......... | H01M 8/04425 |

\* cited by examiner

*Primary Examiner* — Brittany L Raymond
(74) *Attorney, Agent, or Firm* — Quinn IP Law

(57) ABSTRACT

A process for detecting a low-level leak in a fuel cell system is provided. The process includes, within a computerized fuel cell controller, operating programming to monitor operation of the fuel cell system, determine an expected reduction in pressure within an anode gas loop of the fuel cell system based upon the monitored operation, determine a calibrated threshold pressure change based upon the expected reduction in pressure and a margin selected to indicate excess hydrogen gas within the anode gas loop indicating a fuel injector leak, when a fuel injector of the fuel cell system is commanded to a closed state, monitor a pressure within the anode gas loop through a time period, compare the monitored pressure within the anode gas loop through the time period to the calibrated threshold pressure change, and when the comparing indicates the excess hydrogen gas is present, taking remedial action.

19 Claims, 4 Drawing Sheets

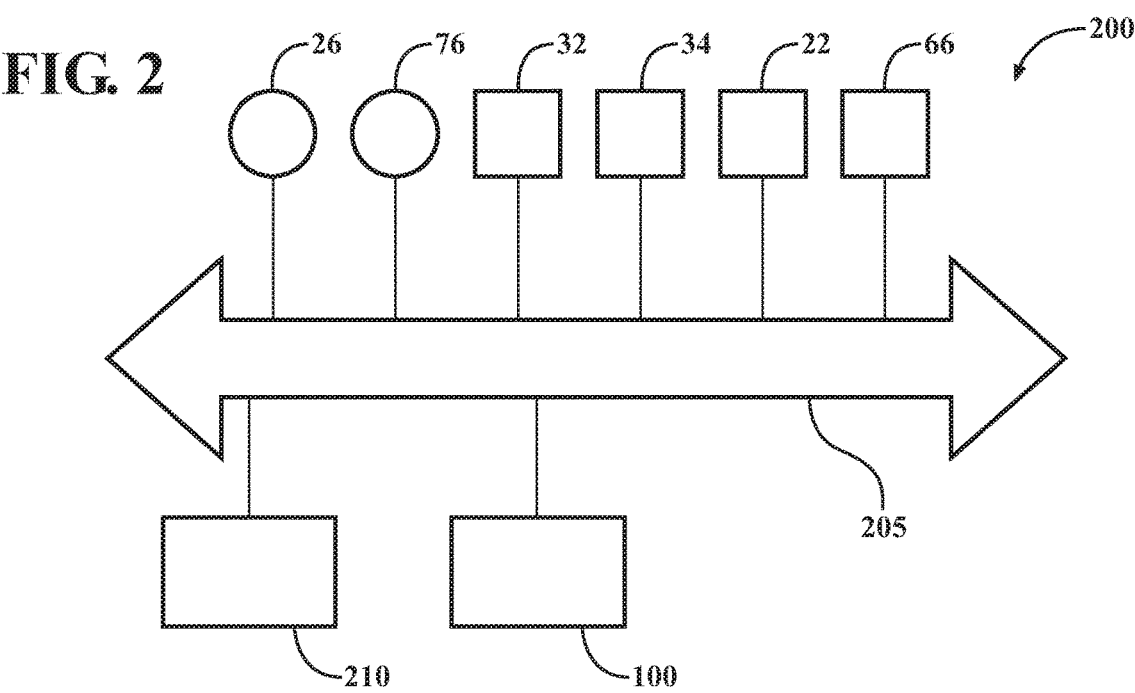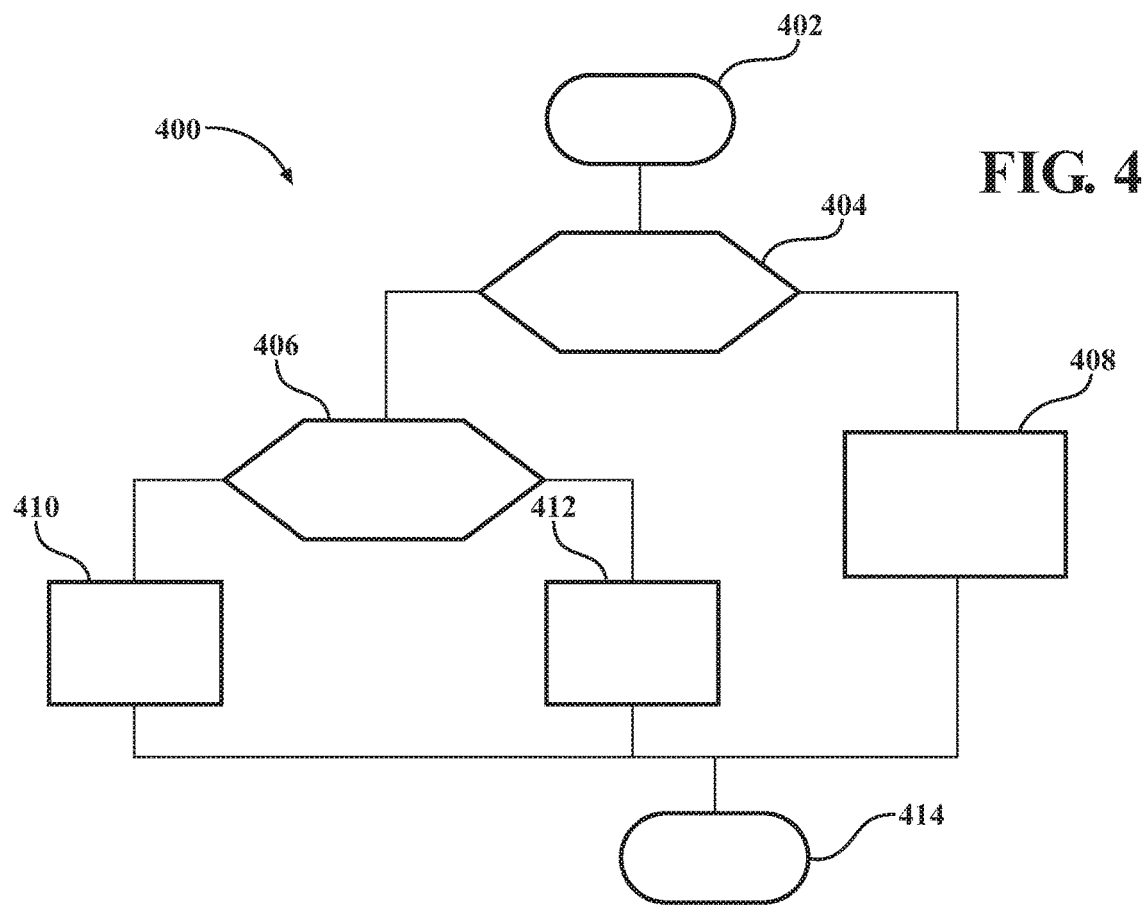

PROCESS AND SYSTEM FOR DETECTING LOW-LEVEL FUEL INJECTOR LEAKAGE IN A FUEL CELL SYSTEM

INTRODUCTION

The disclosure generally relates to a process and system for detecting low-level fuel injector leakage in a fuel cell system.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Hybrid electric and full electric vehicles, on the other hand, utilize alternative power sources to propel the vehicle, such as electric motor generator units (MGU), and therefore minimize or eliminate reliance on a fossil-fuel based engine for tractive power.

Hybrid electric and full electric (collectively "electric-drive") powertrains take on various architectures, some of which utilize a fuel cell system to supply power for one or more electric traction motors. A fuel cell is an electrochemical device generally composed of multiple anode electrodes that receive hydrogen ($H_2$), multiple cathode electrodes that receives oxygen ($O_2$), and multiple electrolytes interposed between each anode and cathode. An electrochemical reaction is induced to oxidize hydrogen molecules at the anode to generate free protons (H+), which are then passed through the electrolyte for reduction at the cathode with an oxidizing agent, such as oxygen. This reaction creates electrons at the anode, some of which are redirected through a load, such as a vehicle's traction motor or a non-vehicular load requiring stationary power generation, before being sent to the cathode. Such a fuel cell may be used in combination with other fuel cells to form a fuel cell stack. This stack of fuel cells or fuel cell stack can be electrically connected to each other, for example, in series, such that the voltage supplied by each fuel cell is added to the next, such that a total voltage supplied by the fuel cell stack is the sum of the voltages of each of the stacked fuel cells.

Hydrogen gas is supplied to the anode by one or more fuel injectors, an electromechanically operated device which selectively opens to provide hydrogen gas and selectively closes to stop the flow of hydrogen gas to the anode.

SUMMARY

A process for detecting a low-level leak in a fuel cell system is provided. The process includes, within a computerized fuel cell controller, operating programming to monitor operation of the fuel cell system, determine an expected reduction in pressure within an anode gas loop of the fuel cell system based upon the monitored operation, determine a calibrated threshold pressure change based upon the expected reduction in pressure and a margin selected to indicate excess hydrogen gas within the anode gas loop indicating a fuel injector leak. The process further includes operating programming within the computerized fuel cell controller to, when a fuel injector of the fuel cell system is commanded to a closed state, monitor a pressure within the anode gas loop through a time period, compare the monitored pressure within the anode gas loop through the time period to the calibrated threshold pressure change, and when the comparing indicates that excess hydrogen gas is present, take remedial action.

In some embodiments, taking the remedial action includes indicating a leaky injector fault.

In some embodiments, taking the remedial action includes, when the fuel cell system becomes not in operation, reducing the hydrogen gas from fuel lines connected to the fuel injector.

In some embodiments, reducing the hydrogen gas from the fuel lines includes closing a shut-off valve to block the hydrogen gas from flowing from a hydrogen gas tank and consuming down the hydrogen gas through operation of the fuel cell system.

In some embodiments, taking the remedial action includes preventing restarting of the fuel cell system based upon comparing the monitored pressure within the anode gas loop through the time period to a critical threshold.

In some embodiments, the process further includes, when the fuel cell system is in operation, determining the expected reduction in pressure within the anode gas loop based upon consumption of the hydrogen gas by the fuel cell system, leakage of the hydrogen gas through a membrane of the fuel cell system, and permeation of the hydrogen gas from the anode gas loop to a compartment outside of the anode gas loop. In some embodiments, the process further includes, when the fuel cell system is not in operation, determining the expected reduction in pressure within the anode gas loop based upon the leakage of the hydrogen gas through the membrane of the fuel cell system, and the permeation of the hydrogen gas from the anode gas loop to the compartment outside of the anode gas loop.

In some embodiments, the process further includes, when the fuel cell system is not in operation, determining the expected reduction in pressure within the anode gas loop based upon the leakage of the hydrogen gas through the membrane of the fuel cell system, and the permeation of the hydrogen gas from the anode gas loop to the compartment outside of the anode gas loop.

According to one alternative embodiment, a process for detecting a low-level leak in a fuel cell system in a vehicle system is provided. The process includes, within a computerized fuel cell controller of the vehicle system, operating programming to monitor operation of the fuel cell system, determine an expected reduction in pressure within an anode gas loop of the fuel cell system based upon the monitored operation, determine a calibrated threshold pressure change based upon the expected reduction in pressure and a margin selected to indicate excess hydrogen gas within the anode gas loop indicating a fuel injector leak. The process further includes operating programming within the computerized fuel cell controller to, when a fuel injector of the fuel cell system is commanded to a closed state, monitor a pressure within the anode gas loop through a time period, compare the monitored pressure within the anode gas loop through the time period to the calibrated threshold pressure change, and when the comparing indicates that the excess hydrogen gas is present, take remedial action.

In some embodiments, taking the remedial action includes indicating to a driver of the vehicle system a leaky injector fault.

In some embodiments, taking the remedial action includes indicating a leaky injector fault to a vehicle maintenance database.

In some embodiments, taking the remedial action includes, when the fuel cell system becomes not in operation, reducing the hydrogen gas from fuel lines connected to the fuel injector.

In some embodiments, taking the remedial action includes preventing restarting of the fuel cell system based upon comparing the monitored pressure within the anode gas loop through the time period to a critical threshold.

In some embodiments, the process further includes, when the fuel cell system is in operation, determining the expected reduction in pressure within the anode gas loop based upon consumption of the hydrogen gas by the fuel cell system, leakage of the hydrogen gas through a membrane of the fuel cell system, and permeation of the hydrogen gas from the anode gas loop to a compartment outside of the anode gas loop.

In some embodiments, the process further includes, when the fuel cell system is not in operation, determining the expected reduction in pressure within the anode gas loop based upon the leakage of the hydrogen gas through the membrane of the fuel cell system, and the permeation of the hydrogen gas from the anode gas loop to the compartment outside of the anode gas loop.

According to one alternative embodiment, a system for detecting a low-level leak related to a fuel cell stack is provided. The system includes the fuel cell stack including an anode, an anode gas loop operable to deliver a flow of hydrogen gas to the anode, a pressure sensor operable to monitor pressure within the anode gas loop, and a fuel injector operable to selectively deliver hydrogen gas to the anode gas loop. The system further includes a computerized fuel cell controller operating programming to monitor operation of the fuel cell stack, determine an expected reduction in pressure within the anode gas loop based upon the monitored operation, and determine a calibrated threshold pressure change based upon the expected reduction in pressure and a margin selected to indicate excess hydrogen gas within the anode gas loop indicating a fuel injector leak. The computerized fuel cell controller further operates programming to, when the fuel injector of the fuel cell system is commanded to a closed state, monitor the pressure within the anode gas loop through a time period, compare the monitored pressure within the anode gas loop through the time period to the calibrated threshold pressure change, and, when the comparing indicates the excess hydrogen gas is present, take remedial action.

In some embodiments, the system further includes a plurality of fuel injectors operable to selectively deliver hydrogen gas to the anode gas loop.

In some embodiments, the computerized fuel cell controller, when the fuel cell system is in operation, further operates programming to determine the expected reduction in pressure within the anode gas loop based upon consumption of the hydrogen gas by the fuel cell system, leakage of the hydrogen gas through a membrane of the fuel cell system, and permeation of the hydrogen gas from the anode gas loop to a compartment outside of the anode gas loop.

In some embodiments, the computerized fuel cell controller, when the fuel cell system is not in operation, further operates programming to determine the expected reduction in pressure within the anode gas loop based upon the leakage of the hydrogen gas through the membrane of the fuel cell system, and the permeation of the hydrogen gas from the anode gas loop to the compartment outside of the anode gas loop.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 schematically illustrates a system communication architecture operable to transmit data between devices, sensors, controllers and other electronic devices in the system, in accordance with the present disclosure;

FIG. 4 is a flowchart illustrating a process for detecting fuel injector leakage in a fuel cell system, in accordance with the present disclosure.

DETAILED DESCRIPTION

Figure 1:
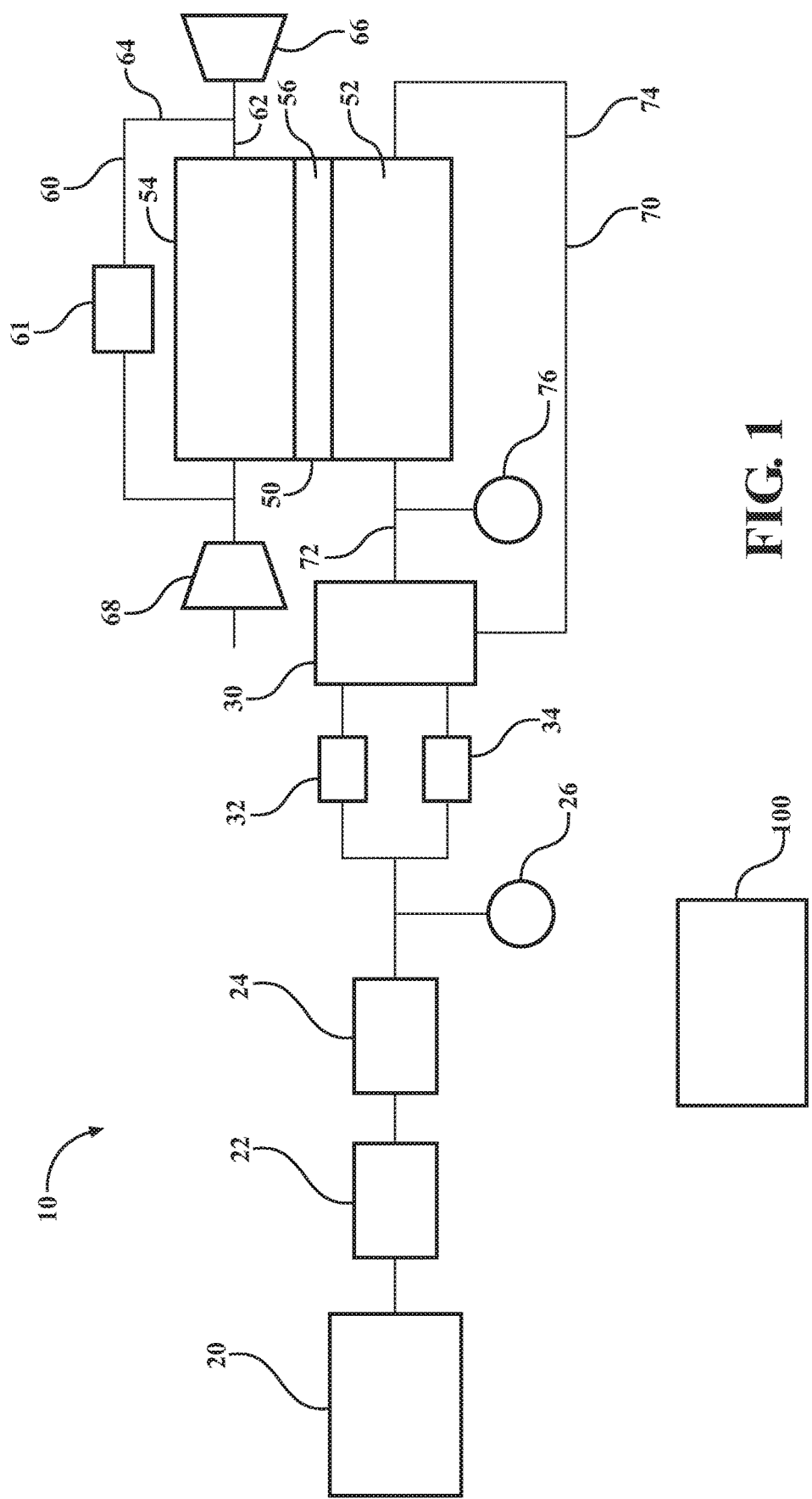
FIG. 1 schematically illustrates an exemplary fuel cell system, in accordance with the present disclosure.

A fuel injector delivers a flow of pressurized hydrogen gas to an anode in a fuel cell application. A hydrogen storage system (HSS) is a system including at least one tank of hydrogen gas, at least one valve controlling flow of the hydrogen gas, and gas lines delivering flows of pressurized hydrogen gas to a fuel cell stack. In some applications where oxygen is scarce, an oxygen tank would similarly need to be supplied, however, with the availability of ambient atmosphere, pressurized air is utilized to supply oxygen gas needed for the reaction. While embodiments illustrated herein utilize pressurized air, it will be appreciated that similar systems and processes could be utilized underwater or outside the atmosphere with such oxygen tanks.

Pressures within the gas supply lines may be significantly higher than ambient air pressure to deliver a desired amount of hydrogen gas upon demand. In one exemplary embodiment, pressures in a high-pressure gas line may exceed 50,000 kPa. Frequently, a pressure regulator is used to create a mid-pressure line from the high-pressure line, receiving a high-pressure flow of hydrogen gas and permitting a capped or limited pressure of hydrogen gas to exit the pressure regulator. Such a gas line attached to the output of the pressure regulator can be described as a mid-pressure line. Under normal operation, injectors vary between open and closed states to deliver a desired anode pressure or hydrogen gas pressure at the anode.

An injector, being an electromechanical device, may experience a fault and be stuck in an open condition or may develop a leak. One process in the art, in reaction to a stuck open injector, is to command a quick stop of the fuel cell stack and the HSS, shutting hydrogen gas valves in the HSS and taking off stack load.

An injector stuck in an open condition may cause high-pressure hydrogen gas within the gas lines to flow through the stuck open injector, causing an overpressure condition at the anode, which may damage the fuel cell stack or anode plumbing, each of which are not designed to contain hydrogen pressure at the high-pressure that exists within the gas lines. An injector with a leak may permit hydrogen gas to flow through the injector. A large or rapid leak in the injector may operate similarly to an injector stuck in an open condition, with pressure in the anode gas loop and at the anode increasing out of control and damaging the fuel cell stack or anode plumbing. A small or slow leak in the injector may include a low-level leak that may pose the same overpressure condition at the anode risking damage to the fuel cell stack or anode plumbing simply based upon the pressure of the hydrogen gas. However, hydrogen gas is reactive and combustible. Uncontrolled presence of hydrogen gas in the anode gas loop may have deleterious effects upon the equipment and/or cause unpredictable operation of the fuel cell stack.

Pressure of hydrogen gas within an anode gas loop may reduce or decrease as a result of a number of factors. Hydrogen gas may be consumed by the fuel cell stack if the fuel cell stack is active. According to one embodiment, a fuel cell stack may be described as active when it has a current density of greater than zero. A rate of consumption may be predicted based upon a current density or an output level of the fuel cell stack. Hydrogen gas may additionally escape from the anode gas loop through permeation or leakage to a compartment outside of the anode gas loop. Hydrogen gas may additionally escape from the anode gas loop through an anode leak, leaking past the fuel cell membrane dividing the anode from a neighboring, paired cathode. As a combination of a predictable rate of consumption, permeation, and anode leak, a zero-injector-leak rate of change in pressure within an anode gas loop may be predicted.

According to one definition, a high-level fuel injector leakage may be defined where, when the fuel cell stack is active, the pressure within the anode gas loop continues to increase despite consumption, permeation, and an anode leak. According to that definition, a low-level fuel injector leakage may be defined where, when the fuel cell stack is active, the pressure within the anode gas loop decreases over time and the pressure within the anode gas loop decreases at a slower rate than a predicted zero-injector-leak rate of change in pressure. According to one embodiment, a threshold rate of change in a decrease in pressure within an anode gas loop as compared to a predicted zero-injector-leak rate of change in pressure can be defined, such that if a monitored change in pressure within the anode gas loop decreases at a slower rate than the predicted zero-injector-leak rate of change in pressure by more than a threshold rate of change in a decrease in pressure within the anode gas loop, a leaky injector may be diagnosed.

A process and system for detecting low-level fuel injector leakage in a fuel cell system is provided. A state of one or more fuel injectors is monitored. A current density of a fuel cell stack is monitored. A state of the fuel cell system is determined based upon the monitored current density. When the fuel cell system is in an operating state, a predicted zero-injector-leak rate of change in pressure within an anode gas loop of the fuel cell stack is predicted based upon the monitored current density. When the fuel injectors are in a closed state, a pressure within the anode gas loop is monitored over a time period, and a rate of change of the pressure within the anode gas loop is determined. When the pressure within the anode gas loop decreases over the time and the rate of change of the pressure within the anode gas loop differs from the predicted zero-injector-leak rate of change in pressure by more than a threshold rate of change in pressure, a low-level fuel injector leak is diagnosed.

A number of remedial and maintenance related options may be performed based upon a diagnosed low-level fuel injector leak. A leaky injector fault may be generated indicating that service of the fuel injectors is appropriate. Upon system shut-down, hydrogen gas may be consumed down from fuel lines to prevent hydrogen gas from building up and causing damage. In certain cases, a system restart may be prevented to avoid excessive leakage or uncontrolled operation.

Throughout the disclosure, hydrogen gas is provided as an exemplary fuel utilized by the fuel cell system. In other embodiments, other fuels may be utilized as a reactant in the fuel cell reaction, and references to hydrogen and hydrogen gas throughout the disclosure may be replaced by another fuel that may be used as a reactant in a fuel cell.

Referring now to the drawings, wherein like reference numbers refer to like features throughout the several views, FIG. 1 schematically illustrates an exemplary fuel cell system. Fuel cell system 10 is illustrated including a fuel cell stack 50, a hydrogen storage tank 20, a fuel injector 32 and a fuel injector 34 suppling flows of hydrogen gas to an ejector device 30. For simplicity sake, a single fuel cell is illustrated including an anode 52 and a cathode 54 separated by a fuel cell membrane 56. A fuel cell system 10 can include a plurality of fuel cell stacks 50 including a plurality of pairs of anodes 52 and cathodes 54. An anode gas loop 70 including a hydrogen gas flow is provided to the anode 52. A cathode gas subsystem 60 including a compressed air flow is provided to the cathode 54. As described herein, the fuel cell stack 50 utilizes the hydrogen gas flow at the anode 52 and the compressed air at the cathode 54 to produce electrical energy for use by the vehicle or system equipped with the fuel cell stack 50.

Hydrogen gas is supplied by hydrogen storage tank 20 at high pressure. Shut-off valve 22 is provided and is capable of selectively permitting or prohibiting hydrogen gas from the hydrogen storage tank 20 to flow to a remainder of the fuel cell system 10. Pressure regulator 24 is provided which controls and steps down the pressure of hydrogen gas from the high pressure delivered by hydrogen storage tank 20 to a medium pressure to be delivered to the fuel injector 32 and the fuel injector 34. A pressure sensor 26 is provided between the pressure regulator 24 and the two fuel injectors, fuel injector 32 and fuel injector 34.

The fuel injector 32 and the fuel injector 34 are operable to selectively open and supply hydrogen gas to the anode gas loop 70 and to selectively close and prohibit hydrogen gas from flowing into the anode gas loop 70. Hydrogen gas is delivered to the fuel injector 32 and the fuel injector 34 at medium pressure. The fuel injector 32 and the fuel injector 34 supply hydrogen gas to the anode gas loop 70 at a low pressure by cycling between an open state and a closed state, opening to increase pressure to a maximum desired anode gas loop pressure, closing when the pressure within the anode gas loop 70 reaches the maximum desired anode gas loop pressure, and opening again when the pressure within the anode gas loop 70 reaches a minimum desired anode gas loop pressure. By opening the fuel injector 32 and the fuel injector 34 when the pressure within the anode gas loop 70 reaches the minimum desired anode gas loop pressure and by closing the fuel injector 32 and the fuel injector 34 when the pressure within the anode gas loop 70 reaches the maximum desired anode gas loop pressure, the fuel injector 32 and the fuel injector 34 may be used to maintain the pressure within the anode gas loop 70 within a desired low pressure range.

The ejector device 30 is a device useful to provide hydrogen gas from the fuel injector 32 and from the fuel injector 34 into the anode gas loop 70. The ejector device 30 includes a venturi configuration. Hydrogen gas flowing through the ejector device 30 flows past a venturi tube within the ejector device 30. The anode gas loop 70 includes an upstream portion 72 upstream of the anode 52 and a downstream portion 74 downstream of the anode 52. The upstream portion 72 includes a high concentration of hydrogen gas. As the hydrogen gas goes through the anode 52, a significant portion of the hydrogen gas may be consumed by the anode 52. However, a lower concentration of hydrogen gas may remain in the downstream portion 74. The downstream portion 74 is connected to the venturi tube of the ejector device 30, such that the movement of hydrogen gas from the fuel injector 32 and the fuel injector 34 through the ejector device 30 and into the upstream portion 72 flows past the venturi device and draws gas from the downstream portion 74 into the gas flowing into the upstream portion 72. In this way, gas from the downstream portion 74 is recycled through the anode 52. A pressure sensor 76 is disposed to monitor a pressure within the upstream portion 72.

Water as a by-product of the chemical reaction of the fuel cell stack may exit the anode 52. The downstream portion 74 may include an anode water separator and an anode drain valve useful to drain the water from the downstream portion 74.

Air is provided to the cathode 54 to supply oxygen for the fuel cell stack reaction. An air compressor 66 is provided drawing in ambient air and providing a pressurized flow of air through a cathode gas subsystem 60. The cathode gas subsystem 60 includes a cathode reactant portion 62 and a cathode bypass portion 64. The cathode reactant portion 62 provides a flow of air to the cathode 54. A bypass valve 61 is connected to the cathode bypass portion 64, and control of the bypass valve 61 may be used to control how much air flows through the cathode bypass portion 64 and how much air flows through the cathode reactant portion 62. This control of how much air flows through the cathode reactant portion 62 may be important to controlling the reaction of the fuel cell stack 50. Air exits through an air expander device 68.

A fuel cell controller 100 is illustrated. The fuel cell controller 100 is a computerized device including at least one processor, random access memory (RAM), durable storage memory, and may include one or more modules executing programmed code or computerized processes or methods including executable steps. Fuel cell controller 100 may operate programming useful to monitor parameters, make determinations, and provide command instructions to various portions of the fuel cell system 10 and the rest of the system receiving electrical power from the fuel cell system 10. The fuel cell controller 100 may be programmed to operate the process 400 of FIG. 4 or a similar process.

FIG. 2 schematically illustrates a system communication architecture 200 operable to transmit data between devices, sensors, controllers and other electronic devices in the fuel cell system 10. The system communication architecture 200 includes the communications bus 205 operable to provide an ability for devices, sensors, controllers and other electronic devices in the system to electronically communicate.

The fuel cell controller 100 is illustrated communicably connected to the communications bus 205. Through the communications bus 205, the fuel cell controller 100 may monitor data from various sources including pressure values from the pressure sensor 26 and the pressure sensor 76. Additionally, the fuel cell controller 100 may control and monitor a status of the fuel injector 32 and the fuel injector 34. Additionally, the fuel cell controller 100 may control operation of the shut-off valve 22 and the air compressor 66.

A fuel cell remedial action controller 210 is illustrated communicably connected to the communication bus 205. The fuel cell remedial action controller 210 is a computerized device including at least one processor, RAM, durable storage memory, and may include one or more modules executing programmed code or computerized processes or process including executable steps. The fuel cell remedial action controller 210 may operate programming useful to receive information or instructions from the fuel cell controller 100, may operate programming useful to notify a driver or a vehicle maintenance database of diagnosed fuel injector leakage, and may operate programming to limit or restrict usage of the fuel cell system 10. The fuel cell controller 100 and the fuel cell remedial action controller 210 are illustrated as separate objects. In another embodiment, the fuel cell controller 100 and the fuel cell remedial action controller 210 may be functions performed within a single computerized device.

Figure 3:
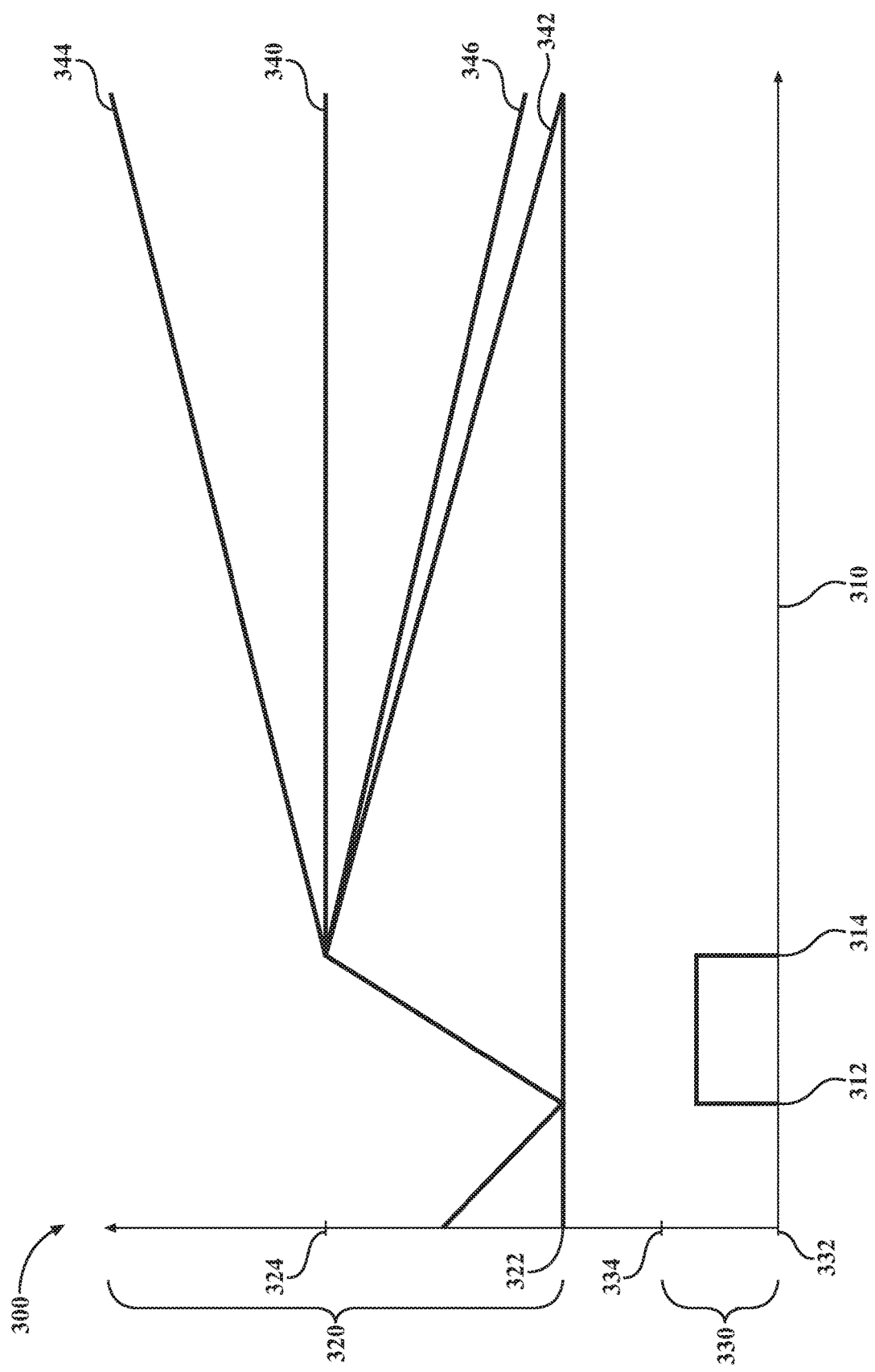
FIG. 3 graphically illustrates pressure measurements within an anode gas loop, wherein a change in pressure over time when injectors are commanded to be closed may be utilized to diagnose an injector leak, in accordance with the present disclosure.

FIG. 3 graphically illustrates pressure measurements within the anode gas loop 70, wherein a change in pressure over time when the fuel injector 32 and the fuel injector 34 are commanded to be closed may be utilized to diagnose an injector leak. FIG. 3 assumes that the fuel cell is operating throughout the illustrated time period. Graph 300 is illustrated, including a vertical axis including a first portion 320 illustrating pressure within the anode gas loop 70 and a second portion 330 illustrating a binary command to open or close the fuel injector 32 and the fuel injector 34. First portion 320 includes a first pressure value 322 equal to a minimum desired anode gas loop pressure and a second pressure value 324 equal to a maximum desired anode gas loop pressure. Second portion 330 includes a value 332 corresponding to the fuel injector 32 and the fuel injector 34 being commanded to be closed. Second portion 330 further includes a value 334 corresponding to the fuel injector 32 and the fuel injector 34 being commanded to be open. A horizontal axis 310 illustrates an elapsed time. Time value 312 corresponds to a time when the pressure equals the first pressure value 322 and the fuel injector 32 and the fuel injector 34 are commanded to transition from a closed state to an open state. As a result, pressure rapidly increases until the pressure reaches the second pressure value 324 at time value 314. At time value 314, the fuel injector 32 and the fuel injector 34 are commanded to transition from the open state to the closed state.

A line 342 illustrates pressure within the anode gas loop 70 reducing rapidly after the time value 314. This reduction in pressure is a result collectively of a combination of hydrogen gas being consumed by the fuel cell stack 50, hydrogen gas permeating or leaking through the membrane 56, and permeation or leakage from the anode gas loop 70 to a compartment outside of the anode gas loop 70. The line 342 represents a normal or expected reduction in pressure within the anode gas loop 70 while the fuel cell stack 50 remains in operation. If the pressure within the anode gas loop 70 reduces at a slower rate than the rate of reduction provided by the line 342, a hydrogen gas leak flowing past one of the fuel injector 32 and the fuel injector 34 may be diagnosed.

A line 340 illustrates pressure within the anode gas loop 70 remaining constant after time value 314. With the fuel cell stack 50 in operation and the fuel injector 32 and the fuel injector 34 commanded to a closed state, pressure within the anode gas loop 70 remaining constant represents a gross leak in one of the fuel injectors, for example, representing a fuel injector stuck in an open state or partially open state. A line 344 illustrates pressure within the anode gas loop 70 increasing after time value 314. If pressure within anode gas loop 70 is plotted after time value 314 and falls in a region between the line 340 and the line 344, a gross leak or a stuck open injector may be diagnosed.

Smaller leaks may be more difficult to detect and diagnose than a gross leak. If pressure is decreasing within the anode gas loop 70, one of the fuel injector 32 and the fuel injector 34 may be leaking hydrogen gas into the anode gas loop 70, but the fuel cell stack may be consuming the hydrogen faster than the leak is occurring. While the hydrogen gas leak is not large enough in this example to cause hydrogen gas to exceed the maximum desired anode gas loop pressure while the fuel cell stack 50 is operating, a leaky injector resulting in a loss of control over hydrogen gas within the system remains a problem, for example, compromising control over the fuel cell stack reaction and posing a risk of uncontrolled increase in pressure within the anode gas loop 70 when the fuel cell stack 50 is no longer in operation or not in run mode. Line 346 is illustrated as an exemplary calibrated threshold pressure change or a threshold decrease in pressure within the anode gas loop 70 that may be used to diagnose a leaky fuel injector. If pressure within anode gas loop 70 is plotted after time value 314 and falls in a region between the line 342 and the line 346, normal operation may be diagnosed, with deviation between the plotted pressure and line 342 being attributable to small variances in system plumbing and sensor error. If pressure within anode gas loop 70 is plotted after time value 314 and falls in a region between the line 346 and the line 340, a leaky fuel injector may be diagnosed. The fuel injector may be in the closed state, but some damage or contamination within the fuel injector internal mechanism may be permitting hydrogen gas to leak past the closed injector. The calibrated threshold pressure change may be based upon the expected reduction in pressure within the anode gas loop 70 and may be adjusted by a margin selected to indicate excess hydrogen gas within the anode gas loop 70 indicating a fuel injector leak.

The example of FIG. 3 illustrates diagnosing a leak in a fuel injector when the fuel cell stack 50 is in operation. In another embodiment, a leak in a fuel injector may be diagnosed when the fuel cell stack 50 is not in operation. In such an example, line 342 may be replaced with a line approximating hydrogen gas leakage through membrane 56 and permeation. Line 346 may be replaced by a line providing a calibrated threshold above the line approximating hydrogen gas leakage past membrane 56 and permeation, and a leak in a fuel injector in a fuel cell system 10 may be diagnosed if a plotted pressure indicates a higher pressure or a slower reduction in pressure as compared to the line replacing line 346.

FIG. 4 is a flowchart illustrating a process 400 for detecting fuel injector leakage in a fuel cell system 10. Process 400 starts at step 402. At step 404, a leak is diagnosed within a fuel injector. In one example, as is illustrated in FIG. 3, a calibrated threshold may be used to compare to plotted pressure measurements within the anode gas loop 70 through a time period and the leak may be diagnosed if the plotted pressure exceeds the calibrated threshold. If the leak is diagnosed in a fuel cell system 10 wherein a fuel cell stack 50 is not in operation or when current density of the fuel cell stack 50 equals zero, the process advances to step 406. If the leak is diagnosed in the fuel cell system 10 wherein the fuel cell stack 50 is in operation or the current density of the fuel cell stack 50 is greater than zero, the process advances to step 408.

In step 406, a determination is made whether pressure within the anode gas loop 70 is increasing. If the pressure within the anode gas loop 70 is not increasing, the leak of hydrogen gas past the leaky fuel injector is an equivalent to other leaks in the anode gas loop 70, and the process advances to step 410. At step 410, a leaky injector fault is indicated. Such a leaky injector fault may be provided directly to the driver. In another embodiment, the leaky injector fault may be logged in a vehicle maintenance database and indicated to the driver through electronic communication and/or preserved for maintenance personnel the next time the vehicle is serviced. After indicating the leaky injector fault, the process may permit the fuel cell system 10 to return to an in-operation status. The process then advances to step 414, where the process ends.

If the pressure within the anode gas loop 70 is determined to be increasing at step 406, the process advances to step 412, wherein remedial action to clear hydrogen gas from the fuel lines leading to the fuel injectors is taken. In one exemplary embodiment, such a remedial action may include, first, closing the shut-off valve 22 and, second, operating the fuel cell stack 50 briefly to consume hydrogen gas between the shut-off valve 22 and the fuel cell stack 50. The process may additionally indicate a leaky injector fault. After indicating the leaky injector fault, the process may permit the fuel cell system 10 to return to an in-operation status. The process then advances to step 414, where the process ends.

In step 408, a determination may be made that the increased pressure indicating increased hydrogen gas presence could lead to equipment damage the next time the fuel cell stack 50 is not in operation. Remedial actions may be taken that include first, permitting the fuel cell system 10 to remain in operation until a next shut-down when the fuel cell stack 50 will be not in operation; second, confirming during the next shut-down that pressure within the anode gas loop 70 is increasing over time; and third, reducing or consuming down hydrogen gas in the fuel lines leading to the fuel injectors by closing the shut-off valve 22 and operating the fuel cell stack 50 briefly to consume hydrogen gas between the shut-off valve 22 and the fuel cell stack 50. Step 408 may optionally include prohibiting a system restart if an increase in pressure within the anode gas loop 70 is above a critical threshold. The process then advances to step 414, where the process ends. Process 400 may be iterative, for example, being run continuously or in repeated cycles to monitor for a leaky injector fault and take appropriate remedial action.

Figure 5:
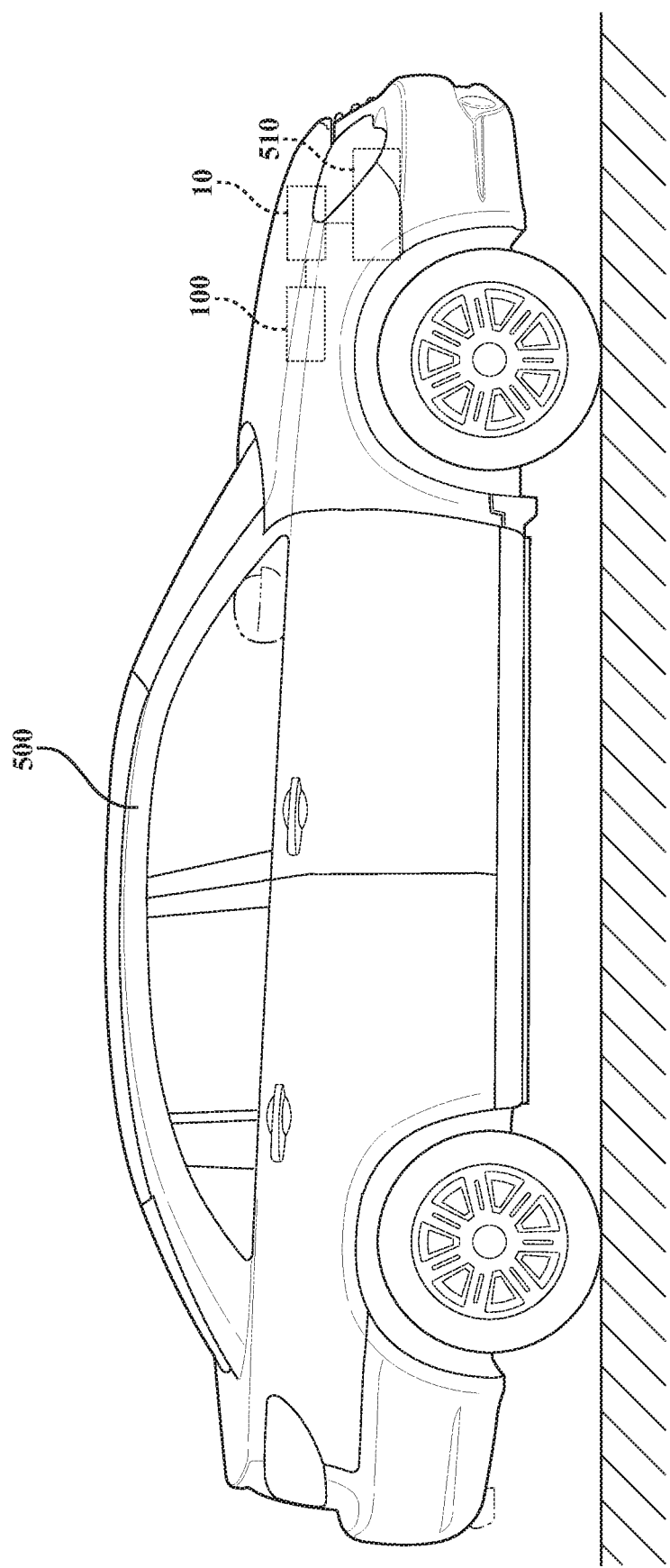
FIG. 5 schematically illustrates an exemplary vehicular system utilizing the fuel cell system of FIG. 1, in accordance with the present disclosure.

Fuel cell system 10 may be operated in various types of systems requiring generation of electrical power. In one embodiment, fuel cell system 10 may be utilized within a power generation unit. FIG. 5 schematically illustrates an exemplary vehicular system 500 utilizing the fuel cell system 10 of FIG. 1. The vehicle system 500 includes a vehicle operable to operate upon an exemplary roadway. The vehicle system 500 includes fuel cell system 10, fuel cell controller 100, and vehicle propulsion system 510. Vehicle propulsion system 510 is a system that may utilize electrical power generated by fuel cell system 10 to provide motive force to vehicle system 500. Vehicle propulsion system 510 may include one or more battery storage devices operable to receive and store electrical energy through chemical reactions. Vehicle propulsion system 510 may additionally include one or more electrical motor generator units operable to convert electrical power into an output torque useful to provide the motive force to vehicle system 500.

While the best modes for carrying out the disclosure have been described in detail, those familiar with the art to which this disclosure relates will recognize various alternative designs and embodiments for practicing the disclosure within the scope of the appended claims.

What is claimed is:

1. A process for detecting a low-level leak in a fuel cell system, comprising:
within a computerized fuel cell controller, operating programming to:
monitor operation of the fuel cell system;
determine an expected reduction in pressure within an anode gas loop of the fuel cell system based upon the monitored operation;
determine a calibrated threshold pressure change based upon the expected reduction in pressure and a margin selected to indicate excess hydrogen gas within the anode gas loop indicating a fuel injector leak;
when a fuel injector of the fuel cell system is commanded to a closed state, monitor a pressure within the anode gas loop through a time period;
compare the monitored pressure within the anode gas loop through the time period to the calibrated threshold pressure change; and
when the comparing indicates the excess hydrogen gas is present, taking remedial action.

2. The process of claim 1, wherein taking the remedial action includes indicating a leaky injector fault.

3. The process of claim 1, wherein taking the remedial action includes, when the fuel cell system becomes not in operation, reducing hydrogen gas from fuel lines connected to the fuel injector.

4. The process of claim 3, wherein reducing the hydrogen gas from the fuel lines includes closing a shut-off valve to block the hydrogen gas from flowing from a hydrogen gas tank and consuming down the hydrogen gas through operation of the fuel cell system.

5. The process of claim 1, wherein taking the remedial action includes preventing restarting of the fuel cell system based upon comparing the monitored pressure within the anode gas loop through the time period to a critical threshold.

6. The process of claim 1, further comprising, when the fuel cell system is in operation, determining the expected reduction in pressure within the anode gas loop based upon consumption of hydrogen gas by the fuel cell system, leakage of the hydrogen gas through a membrane of the fuel cell system, and permeation of the hydrogen gas from the anode gas loop to a compartment outside of the anode gas loop.

7. The process of claim 6, further comprising, when the fuel cell system is not in operation, determining the expected reduction in pressure within the anode gas loop based upon the leakage of the hydrogen gas through the membrane of the fuel cell system and the permeation of the hydrogen gas from the anode gas loop to the compartment outside of the anode gas loop.

8. The process of claim 1, further comprising, when the fuel cell system is not in operation, determining the expected reduction in pressure within the anode gas loop based upon leakage of hydrogen gas through a membrane of the fuel cell system and permeation of the hydrogen gas from the anode gas loop to a compartment outside of the anode gas loop.

9. A process for detecting a low-level leak in a fuel cell system in a vehicle system, comprising:
within a computerized fuel cell controller of the vehicle system, operating programming to:
monitor operation of the fuel cell system;
determine an expected reduction in pressure within an anode gas loop of the fuel cell system based upon the monitored operation;
determine a calibrated threshold pressure change based upon the expected reduction in pressure and a margin selected to indicate excess hydrogen gas within the anode gas loop indicating a fuel injector leak;
when a fuel injector of the fuel cell system is commanded to a closed state, monitor a pressure within the anode gas loop through a time period;
compare the monitored pressure within the anode gas loop through the time period to the calibrated threshold pressure change; and
when the comparing indicates the excess hydrogen gas is present, taking remedial action.

10. The process of claim 9, wherein taking the remedial action includes indicating to a driver of the vehicle system a leaky injector fault.

11. The process of claim 9, wherein taking the remedial action includes indicating a leaky injector fault to a vehicle maintenance database.

12. The process of claim 9, wherein taking the remedial action includes, when the fuel cell system becomes not in operation, reducing hydrogen gas from fuel lines connected to the fuel injector.

13. The process of claim 9, wherein taking the remedial action includes preventing restarting of the fuel cell system based upon comparing the monitored pressure within the anode gas loop through the time period to a critical threshold.

14. The process of claim 9, further comprising, when the fuel cell system is in operation, determining the expected reduction in pressure within the anode gas loop based upon consumption of hydrogen gas by the fuel cell system, leakage of the hydrogen gas through a membrane of the fuel cell system, and permeation of the hydrogen gas from the anode gas loop to a compartment outside of the anode gas loop.

15. The process of claim 9, further comprising, when the fuel cell system is not in operation, determining the expected reduction in pressure within the anode gas loop based upon leakage of hydrogen gas through a membrane of the fuel cell system and permeation of the hydrogen gas from the anode gas loop to a compartment outside of the anode gas loop.

16. A system for detecting a low-level leak related to a fuel cell stack, comprising:
the fuel cell stack including an anode;
an anode gas loop operable to deliver a flow of hydrogen gas to the anode;
a pressure sensor operable to monitor pressure within the anode gas loop;
a fuel injector operable to selectively deliver the hydrogen gas to the anode gas loop; and
a computerized fuel cell controller, operating programming to:
monitor operation of the fuel cell stack;
determine an expected reduction in pressure within the anode gas loop based upon the monitored operation;
determine a calibrated threshold pressure change based upon the expected reduction in pressure and a margin selected to indicate excess hydrogen gas within the anode gas loop indicating a fuel injector leak;
when the fuel injector of the fuel cell system is commanded to a closed state, monitor the pressure within the anode gas loop through a time period;
compare the monitored pressure within the anode gas loop through the time period to the calibrated threshold pressure change; and
when the comparing indicates the excess hydrogen gas is present, take remedial action.

17. The system of claim 16, further comprising a plurality of fuel injectors operable to selectively deliver the hydrogen gas to the anode gas loop.

18. The system of claim 16, wherein the computerized fuel cell controller, when the fuel cell system is in operation, further operates programming to determine the expected reduction in pressure within the anode gas loop based upon consumption of the hydrogen gas by the fuel cell system, leakage of the hydrogen gas through a membrane of the fuel cell system, and permeation of the hydrogen gas from the anode gas loop to a compartment outside of the anode gas loop.

19. The system of claim 16, wherein the computerized fuel cell controller, when the fuel cell system is not in operation, further operates programming to determine the expected reduction in pressure within the anode gas loop based upon leakage of the hydrogen gas through a membrane of the fuel cell system and permeation of the hydrogen gas from the anode gas loop to a compartment outside of the anode gas loop.

* * * * *